US006926638B1

(12) United States Patent
Gimmler et al.

(10) Patent No.: US 6,926,638 B1
(45) Date of Patent: Aug. 9, 2005

(54) METHOD FOR CARRYING OUT AN AUTOMATED CLUTCH ACTUATION DURING NON-DRIVEN OPERATIONAL PHASES

(75) Inventors: Helmut Gimmler, Schwaikheim (DE); Peter-Klaus Kuhn, Plüderhausen (DE); Christian Onnen, Esslingen (DE); Friedrich Scherer, Unterensingen (DE); Alexander Schwarz, Ettlingen (DE); Michael Weiss, Backnang (DE); Udo Wollenhaupt, Kernen (DE); Fredy Eckstein, deceased, late of Winnenden/Birkmannsweiler (DE); by Florian Fredy Eckstein, legal representative, Winnenden (DE); by Ursula Else Eckstein, legal representative, Winnenden (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/959,689

(22) PCT Filed: Apr. 4, 2000

(86) PCT No.: PCT/EP00/02970

§ 371 (c)(1), (2), (4) Date: Feb. 28, 2002

(87) PCT Pub. No.: WO00/66905

PCT Pub. Date: Nov. 9, 2000

(30) Foreign Application Priority Data

May 3, 1999 (DE) ........................................ 199 20 065

(51) Int. Cl.[7] .......................... B60K 41/02; B60K 41/24

(52) U.S. Cl. ......................... 477/86; 477/171; 477/175; 477/901; 477/905; 701/97

(58) Field of Search ................................ 477/174, 175, 477/86, 901, 905, 171; 701/96, 65, 67, 117, 300, 301; 180/282; 192/3.51, 13 R

(56) References Cited

U.S. PATENT DOCUMENTS

| | | | | |
|---|---|---|---|---|
| 4,842,113 A | | 6/1989 | Lutz | |
| 4,961,484 A | * | 10/1990 | Kato et al. | 192/3.31 |
| 5,349,267 A | | 9/1994 | Brassier et al. | |
| 5,678,650 A | * | 10/1997 | Ishihara et al. | 180/169 |
| 5,757,949 A | * | 5/1998 | Kinoshita et al. | 382/104 |
| 6,070,118 A | * | 5/2000 | Ohta et al. | 701/65 |
| 6,125,321 A | * | 9/2000 | Tabata et al. | 701/97 |
| 6,219,609 B1 | * | 4/2001 | Matsuno et al. | 701/72 |
| 6,223,118 B1 | * | 4/2001 | Kobayashi et al. | 701/96 |
| 6,466,851 B2 | * | 10/2002 | Kato et al. | 701/51 |

FOREIGN PATENT DOCUMENTS

| | | |
|---|---|---|
| DE | 3204002 | 8/1983 |
| DE | 3127425 | 10/1984 |
| DE | 3430983 | 8/1988 |

(Continued)

*Primary Examiner*—Dirk Wright
(74) *Attorney, Agent, or Firm*—Crowell & Moring LLP

(57) ABSTRACT

The invention relates to a process for carrying out an automated clutch actuation of a motor vehicle with a drive engine and a transmission, connected to said drive engine by way of a clutch, in which process the clutch exhibits both an opened and a closed operating position, whereby to introduce unpowered operating phases the clutch is transferred by means of automation into the opened operating position and to introduce powered operating phases it is transferred by means of automation into the closed operating position.

To design such a process more reliably and comfortably, the variables, from which a dangerous situation in time or its termination can be concluded with a certain probability, are measured, according to the invention, so that the clutch can be moved into an operating position (opened or closed), which makes it possible to carry out faster the subsequent request of the driver—such as an acceleration request or a braking request.

36 Claims, 1 Drawing Sheet

FOREIGN PATENT DOCUMENTS

| | | |
|---|---|---|
| DE | 3822316 | 2/1989 |
| DE | 4213589 | 11/1992 |
| DE | 4302500 | 8/1993 |
| DE | 4334210 | 4/1994 |
| DE | 4419633 | 12/1994 |
| DE | 19700325 | 7/1997 |
| DE | 19653935 | 6/1998 |
| DE | 19829861 | 1/1999 |
| DE | 19827117 | 12/1999 |
| DE | 19635809 | 2/2000 |
| DE | 19838169 | 7/2000 |
| EP | 05296346 | 3/1993 |
| EP | 0860624 | 8/1998 |
| GB | 279123 | 12/1994 |
| JP | 2175438 | 7/1990 |
| WO | 88/05199 | 7/1988 |
| WO | 00/06410 | 2/2000 |

* cited by examiner

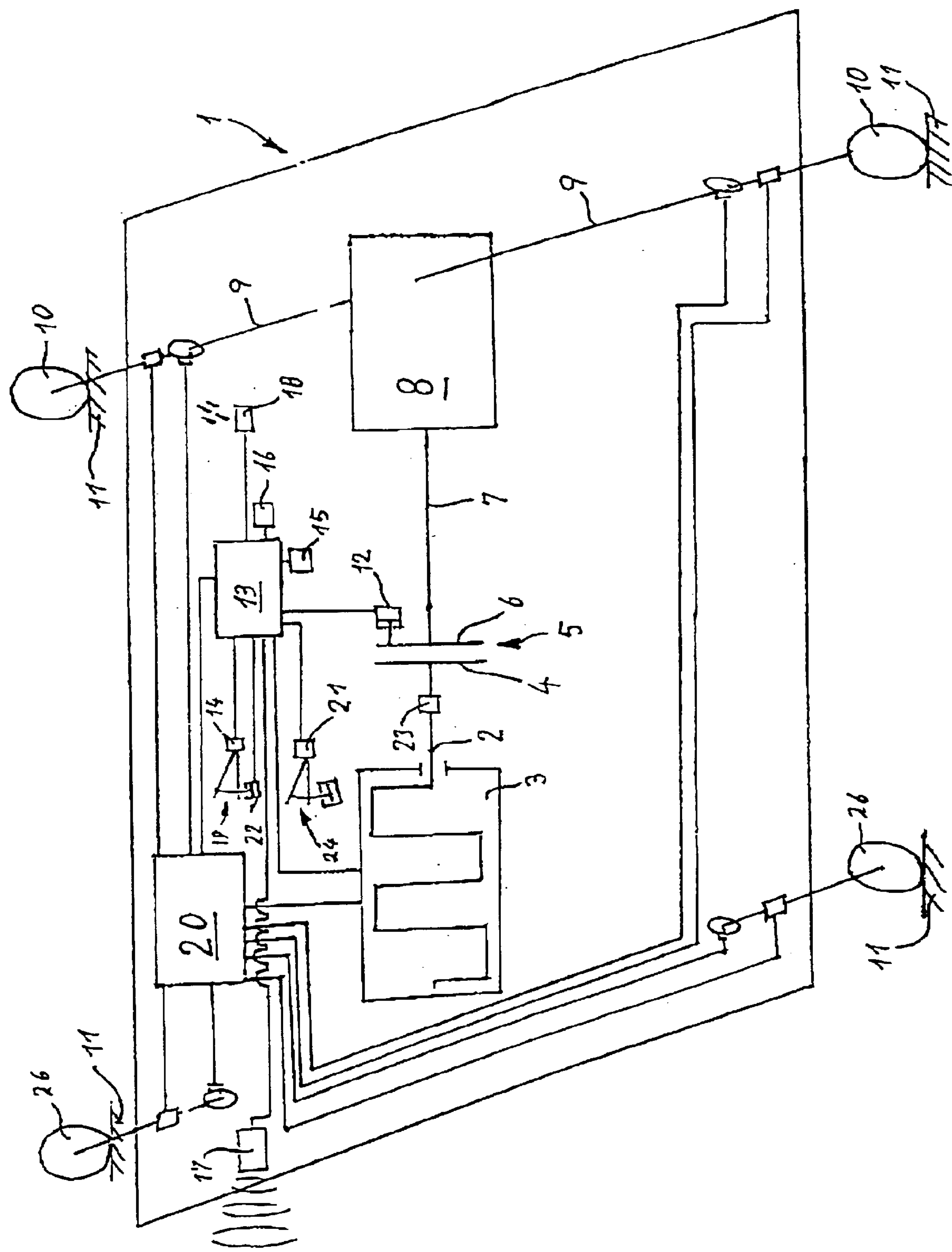

METHOD FOR CARRYING OUT AN AUTOMATED CLUTCH ACTUATION DURING NON-DRIVEN OPERATIONAL PHASES

CLAIM FOR PRIORITY

This application claims the priority of German Patent Document 199 20 065.3, filed May 3, 1999, the disclosure of which is expressly incorporated by reference herein.

BACKGROUND AND SUMMARY OF THE INVENTION

The invention relates to a process for carrying out an automated clutch actuation.

The German Reference DE 197 00 325 A1 shows a process for actuating a drive arrangement of a motor vehicle. The drive arrangement comprises a drive engine, a transmission, a clutch and a control unit. The clutch is disposed in the force flow between the drive engine and the transmission and can be moved in and out by means of the control unit.

After setting the driving speed (for example, by means of the gas pedal), the driving speed is adjusted by the control unit by means of the power setting element (throttle flap or injection pump). If this driving speed remains constant over a specific period, the clutch is opened to save fuel and the drive engine is adjusted back to idle speed. If, at this stage following this drive mode phase with opened clutch, the driving speed falls below a specific driving speed-dependent threshold value, the clutch is closed again.

The German Reference DE 42 13 589 A1 discloses a process to carry out an automated clutch actuation of a motor vehicle, in which process the automated clutch actuation is not performed until after a time delay, whereby its duration of time depends on the transmission ratio of the transmission and on the speed of the motor vehicle.

The object of the invention is to design a generic process more reliably and more comfortably.

It is an advantage of the invention that the variables, from which a dangerous situation in time or its termination can be concluded with a certain probability, are sensed so that the clutch can be moved into an operating position (opened or closed), which makes it possible to carry out faster the subsequent wish of the driver—such as an acceleration request or a braking request.

It is another advantage of the design that fuel is saved when a decrease in speed is desired.

It is a further advantage of the design of the process that the motor vehicle driver obtains feedback concerning which deflection or at which angle of the gas pedal the clutch changes the operating position. Thus, in the case of motor vehicle drivers, who are uncertain about the operating position of the clutch, and who want to achieve with certainty a specific operating position of the clutch, it is prevented in an advantageous manner that these motor vehicle drivers have to deflect the gas pedal to the maximum degree into one of the two possible directions. Thus, besides the subjective feeling of greater certainty, the advantages with respect to fuel consumption and driving safety are obtained.

Is it another advantage of the invention that braking, such as full braking in a dangerous situation, can be carried out without the brake system having to generate an additional braking torque in order to decelerate the output shaft of the drive engine.

The present invention involves a process wherein in the unpowered drive mode on a downgrade the clutch is closed in order to utilize the drag torque of the drive engine to decelerate the motor vehicle.

Another advantage of the invention is that the motor vehicle can also be accelerated, when the gas pedal is in a position that corresponds to the momentary speed of the motor vehicle. This situation that a relatively high rate of change of the gas pedal is detected, and that the motor vehicle exhibits, nevertheless, a speed that corresponds to the position of the gas pedal, can occur, for example, in a process for operating a drive arrangement in a motor vehicle, in which a tolerance range is provided for the angle of the gas pedal within which the unpowered operating phase does not end.

BRIEF DESCRIPTION OF THE DRAWINGS

The sole FIGURE schematic is a complete carrier circuit diagram of a device, in which a process carries out an automated clutch actuation of a motor vehicle 1.

DETAILED DESCRIPTION OF THE PREFERRED EMBODIMENT

An output shaft 2 of a drive engine 3 is connected to one half 4 of a clutch 5, whereas a second half 6 of the clutch 5 is connected to an input shaft 7 of a transmission 8. The transmission 8 drives by means of the semi-shafts 9 the drive wheels 10, which in drive mode affect the advance of the motor vehicle 1 with respect to the road 11, whereby a coefficient of friction is effective between the drive wheels 10 and the road 11. Furthermore, the motor vehicle 1 exhibits non-driven wheels 26, which also roll on the road 11.

The two halves 4, 6 of the clutch can be connected together and separated from each other by means of a setting element 12 that can be moved in and out. The connecting together of the halves 4, 6 of the clutch is referred to as the closing of the clutch 5, and the separating of the halves 4, 6 of the clutch from each other is referred to as the opening of the clutch 5. In a powered operating phase the clutch 5 is in the closed operating position, whereas in an unpowered operating phase of the motor vehicle 1 the clutch 5 is opened.

The moving in and out of the setting element 12 or the opening and closing of the clutch 5 is controlled or in an alternative embodiment regulated by a controller 13. Sensor signals from

- a gas pedal angle sensor 14,
- a transversal acceleration sensor 15,
- a longitudinal acceleration sensor 16,
- a braking force sensor 21,
- a distance sensor 17,
- a rain sensor 18,
- a dynamic drive controller 20 (such as the electronic stability program ESP) and an engine speed sensor 23 are fed to the controller 13.

A speed request is made by deflecting a gas pedal 19 about an angle. The gas pedal angle sensor 14 records the actual angle of the gas pedal 19 and forwards it to the controller 13. The controller 13 passes this speed request to the drive engine 3, until the desired speed is reached. If a torque of approximately zero is measured by the engine torque sensor 23 over a specific period of time, the controller 13 sends a signal to the setting element 12 to open the clutch 5. The duration of the period of time depends on the drive engine speed and the transmission ratio adjusted from time to time at the transmission 8 or on the resulting speed, whereby higher speeds need a shorter period of time than low speeds. In this unpowered operating phase the gas pedal 19 can be deflected within a tolerance angle, without the clutch 5 being closed again. This angle of tolerance is defined by the upper limiting value and the lower limiting value. These limit values are perceived by the motor vehicle driver as the pressure points. That is, the gas pedal 19 exhibits a resistance setting element 22, by means of which a resistance to a deflection of the gas pedal 19 can be adjusted. This resistance setting element 22 is controlled by the controller 13, since the pressure points, to be adjusted at the resistance setting element 22, are dependent on the entered speed request, the drive engine speed and the transmission ratio in the transmission 8.

The controller 13 senses the rate of change of the gas pedal angle by taking its time derivative. If this derivation or ascent is greater than zero or positive, it is referred to as a positive rate of change of the gas pedal angle.

If, on the other hand, the ascent is less than zero or negative, the rate of change is referred to as a negative rate of change of the gas pedal angle. Correspondingly the sign (negative or positive) indicates in which direction the gas pedal 19 is deflected. Rates of change of the gas pedal angle in the direction of maximum deflection are provided with a positive sign, whereas rates of change of the gas pedal angle in the direction of the unactuated gas pedal 19 are provided with a negative sign. When referencing an arbitrary variable (for example a threshold value), a negative rate of change falls below this variable, when this variable is provided with a negative sign and the absolute value of the variable is less than the absolute value of the rate of change. For example, a negative rate of change of the gas pedal angle of −5 degrees per second falls below a threshold value of −4 degrees per second.

The function of the sensors 14, 15, 16, 21, 17, 18, 23 and the dynamic drive controller 20 are explained below together with the controller 13 and the clutch 5.

If the controller 13 senses a positive rate of change of the gas pedal angle which exceeds a threshold value and which depends on the drive engine speed and the transmission ratio adjusted from time to time at the transmission 8, the clutch 5 is closed. Thus, it is guaranteed that the acceleration request, made by means of the gas pedal 19, can also lead to an acceleration of the motor vehicle 1, when the gas pedal 19 is located within the tolerance angle between the lower limiting value and the upper limiting value of the gas pedal angle.

If the controller 13 senses a negative rate of change of the gas pedal angle which falls below a threshold value and which depends on the drive engine speed and the transmission ratio, adjusted from time to time at the transmission 8, the controller 13 sends a signal to open the clutch 5 to the setting element 12. By uncoupling the drive engine 3 from the transmission 8, a subsequent braking—such as full braking—can be introduced without having to decelerate the rotating output shaft 2 of the drive engine 3 by means of a brake system of the motor vehicle 1.

If, however, this negative rate of change exceeds the threshold value, from which a subsequent braking action can proceed, but falls below another threshold value that depends on the drive engine speed and transmission ratio and if the motor vehicle 1 senses a gradient, the clutch 5 is closed, if it is in the opened operating position. Thus, for example, in drive mode on a downgrade the braking power of the drive engine 3 is fully utilized. The gradient is determined based on the evaluations of the dynamic drive controller 20 or in an alternative design by means of an inclination sensor.

If the controller 13 senses by means of the transversal acceleration sensor 15 a transversal acceleration that exceeds a threshold value that depends on the drive engine speed, the transmission ratio, adjusted from time to time at the transmission 8, and the motor vehicle speed, the clutch 5 is automatically closed. Thus, an acceleration request, requested by means of the gas pedal, can be fulfilled from a curve without having to wait for the clutch 5 to be closed.

If the controller 13 determines by means of the braking force sensor 21 a variable, representing the actuation of the brake 24 and which exceeds a threshold value that depends on the drive engine speed, the transmission ratio, adjusted from time to time at the transmission 8, and the motor vehicle speed, then the clutch 5 is opened by the controller 13 by means of the setting element 12. By means of this uncoupling of the drive engine 3 from the transmission 8 a subsequent braking—such as full braking—can be initiated without having to decelerate the output shaft 2 of the drive engine 3.

The variable, representing the actuation of the brake 24, can be, for example, the brake pedal angle and/or the brake pressure.

The controller 13 senses the rate of change of the braking force by taking its time derivative. If this derivative or ascent is greater than zero or positive, it is called the positive rate of change of the braking force. If, on the other hand, the ascent is less than zero or negative, the rate of change is called the negative rate of change of the braking force. Correspondingly the sign (negative or positive) indicates whether the braking force is increasing or decreasing. Rates of change of the braking force in the direction of the maximum braking force are provided with a positive sign, whereas rates of change of the braking force in the direction of the unactuated brake 24 are provided with a negative sign.

If the controller 13 senses a positive rate of change of the braking force that exceeds a threshold value that depends on the drive engine speed and the transmission ratio, adjusted from time to time at the transmission 8, then the clutch 5 is opened in order to enable a subsequent braking action without having to decelerate the output shaft 2 of the drive engine 3.

If the controller 13 senses a negative rate of change of the braking force which exceeds a threshold value and which depends on the drive engine speed and the transmission ratio, adjusted from time to time at the transmission 8, then the clutch 5 is closed in order to enable a subsequent acceleration request of the motor vehicle 1 by means of the gas pedal 19 without having to wait for the closing of the clutch 5.

If the controller 13 senses by means of the distance sensor 17 the distance to the motor vehicle driving ahead and their distance falls below a threshold value that depends on the drive engine speed and the transmission ratio, adjusted from time to time at the transmission 8, or the speed, then the clutch 5 is opened. By means of this uncoupling of the drive engine from the transmission 8, a subsequent braking—such as full braking—can be initiated without having to decelerate the output shaft 2 of the drive engine 3 by means of the brake system.

This threshold value depends on the speed in such a manner that, at high speeds of the motor vehicle 1 at a relatively large distance to the vehicle driving ahead, the clutch 5 is already opened in expectation of a braking action, whereas at low speeds the clutch 5 is not opened in expectation of a braking action until the distances are already relatively small.

The controller 13 senses the rate of change of the distance to the vehicle driving ahead by taking its time derivative. In this respect a rate of change of the distance that is based on an increase in the distance is positive, whereas a rate of change of the distance that is based on a decrease in the distance is negative.

If the controller 13 senses a negative rate of change of the distance that falls below a threshold value that depends on the drive engine speed and the transmission ratio, adjusted from time to time at the transmission 8, then the clutch 5 is opened.

By means of this uncoupling of the drive engine 3 from the transmission 8, a subsequent braking—such as full braking —can be initiated without having to decelerate the output shaft 2 of the drive engine 3 by means of the brake system.

If the controller receives the information that there are bad weather conditions, the clutch 5 is closed. Simultaneously unpowered operating phases are eliminated. Thus, in rain, fog and ice excessive opening and closing of the clutch 5 and thus coupling and uncoupling jolts are prevented. Furthermore, it is still possible for the dynamic drive controller 20 to act effectively on the engine.

The bad weather conditions are determined, on the one hand, by means of the rain sensor 18. Furthermore, information on the coefficient of friction between the drive wheels 10 and the road 11 can be obtained from the dynamic drive controller 20, since this dynamic drive controller 20 measures the speed differential between the driven wheels 10 and the non-driven wheels 26.

However, information about the weather conditions can also be obtained by means of the state of the rear fog light or the front fog light (on or off). For example, information about the state of the road 11 or about the coefficient of friction can also be obtained from a reflection sensor that measures the reflection of the light on the road 11. To determine the weather and in particular the visibility conditions, it is possible to use an infrared sensor that detects the reflection of the infrared light on particles (for example, fog or dust).

A storage unit that can be updated and that represents the variables in a virtual road network that are relevant for the operating position of the clutch 5 is integrated into the controller 13. The actual position of the motor vehicle 1 is determined by means of satellite position finding and compared with the virtual road network at any time. The variables, represented in this virtual road network, can be divided into three areas:

topographical variables, variables that regulate the traffic and variables that relate to dangerous spots.

Topographical variables comprise, among other things, differences in the elevation of the road segment. With these variables the controller 13 can determine in advance, for example; whether opening the clutch 5, upon sensing a torque of zero by means of the engine torque sensor 23, is meaningful or whether, owing to the following ascent, the clutch 5 remains closed. Furthermore, irregularities in the course of the road (for example, long downgrade, interrupted by a short ascent) can be considered in such a manner that in the unpowered drive mode they do not result in the closing of the clutch 5.

Traffic-regulating variables comprise, among other things, the position of the speed limits or stop signs on the road.

Variables that relate to dangerous spots comprise, for example, the position of bridges with the danger of slick ice or with 1 curves. Before these dangerous spots are reached, the clutch 5 is closed by automation and in the area of these dangerous spots held closed. Thus, it is possible for the dynamic drive controller 20 to act effectively on the drive engine speed.

The variables (relating to topography, traffic control and dangerous spots) can be updated by means of a radio network.

The threshold values, resulting in an opening of the clutch 5 in expectation of a braking action when values exceed or fall below the threshold, exhibit at high speeds—that is, when the drag torque of the drive engine is especially high—a larger absolute value than at low speeds. Thus, the drag torque of the drive engine 3 can be used to support a braking action at high speeds, whereas at low speeds—that is, when the drag torque of the drive engine 3 is especially low—the clutch 5 is opened before the start of the braking action.

Analogously the threshold values, resulting in an opening of the clutch in expectation of a braking action when values exceed or fall below the threshold, exhibit in low gear or at a high transmission ratio—that is, when the drag torque of the drive engine is especially high—a larger absolute value than in high gear or at a small transmission ratio.

In the illustrated embodiment the drive engine 3 can be operated in idle mode when the clutch 5 is open. In another embodiment the fuel feed of the drive engine can be interrupted when the clutch is open. It is also possible to link together the conditions for the opening and closing of the clutch in such a manner that exclusively in situations, where it must be assumed that the clutch remains open over a prolonged period of time, the fuel feed of the drive engine is interrupted.

In another embodiment of the invention the clutch can be closed upon sensing a negative rate of change of the distance to a vehicle driving ahead and said rate falls below the variable threshold value, when the clutch was first in the opened state and a low gear—that is, a large transmission ratio—is put into gear. Due to the high drag torque of the drive engine in this situation a braking action of the motor vehicle or an increase in the distance to the motor vehicle driving ahead is achieved.

The transmission of the motor vehicle can be designed to be a manually shifted transmission, a partially or fully automated transmission, an automatic transmission or a continuously variable transmission. In the case of manually shifted and automated transmissions, such as the countershaft transmissions, the starting clutch can be used in order to shift the motor vehicle from driven into the unpowered state. One possible embodiment of a countershaft transmission is the twin clutch transmission. Suitable continuously variable transmissions are both a looping transmission and a toroidal transmission. Automatic transmissions can be shifted into neutral position in order to shift the motor vehicle from the driven into the unpowered operating phase. Thus, the unpowered operating phase can ensue by opening any arbitrarily suitable clutch inside the transmission.

The drive engine can be both an internal combustion engine and an electric motor.

In another implementation of the process and as an alternative to opening the clutch when transferring a torque of zero, the clutch is opened when both the gas pedal angle and the motor vehicle speed remain at least approximately constant for a specific period to time, for example, ranging from 0 to 3 seconds.

In another implementation of the invention the threshold values are adapted to the type of motor vehicle driver. For this purpose the device, in which a process for carrying out an automated clutch actuation of the motor vehicle comes into effect, exhibits a signal processing unit that is capable of storing. This signal processing unit recognizes the type of driver due to the appropriate variables found for the motor vehicle—such as the longitudinal acceleration and the transversal acceleration—and stores the information concerning this driving behavior.

With this existing information the threshold values, which result in the opening and closing of the clutch, are altered so as to match the driver.

To what extent the threshold values are changed depends on the comfort and safety requirements of the motor vehicle. Thus, the threshold values for a sporting driver can be changed to the effect that the clutch remains closed over a wide range in order to enable a faster response to the acceleration that the sporting driver wants. For safety reasons, however, precisely for the hesitant driver the clutch can remain closed over a wide range in order to carry out rapidly his calm—in contrast to the sporting driver—request for acceleration even in dangerous situations.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A process for carrying out an automated clutch actuation of a first motor vehicle with a drive engine and a transmission wherein the clutch exhibits both an opened and a closed operating position, and wherein transferring the clutch, by means of automation, into the opened operating position introduces unpowered phases wherein there is no power transferred from the drive engine to the transmission and, transferring the clutch by means of automation into the closed operating position introduces power operating phases, wherein power is transferred from the drive engine to the transmission wherein a distance to a second motor vehicle driving ahead is determined and the operating position of the clutch depends on said distance.

2. The process for carrying out an automated clutch actuation, as claimed in claim 1, wherein the distance is sensed over time; and from said sensing the rate of change of the distance to a motor vehicle driving ahead is derived.

3. The process for carrying out an automated clutch actuation, as claimed in claim 2, wherein the clutch is opened by means of automation, when the rate of change of the distance falls below a negative threshold value.

4. The process for carrying out an automated clutch actuation, as claimed in claim 1, wherein the clutch is opened by means of automation, when the value of the distance falls short of a threshold.

5. The process for carrying out an automated clutch actuation, as claimed in claim 2, wherein the clutch is closed by means of automation, when the rate of change of the distance is positive and exceeds a threshold value.

6. The process for carrying out an automated clutch actuation, as claimed in claim 1, wherein a gas pedal angle is sensed, and that the gas pedal angle is sensed over time, and from said sensed gas pedal angle over time the rate of change of the gas pedal angle is derived, and the operating position of the clutch (5) depends on this rate of change.

7. The process for carrying out an automated clutch actuation, as claimed in claim 1, wherein a transversal acceleration is sensed, and the operating position of the clutch (5) depends on the transversal acceleration.

8. The process for carrying out an automated clutch actuation, as claimed in claim 1, wherein at least a visibility value, representing the visibility conditions, is sensed; and the clutch is closed by means of automation, when said visibility value falls below a threshold, and that the unpowered operating phases are eliminated as long as said value remains short of the threshold.

9. The process for carrying out an automated clutch actuation, as claimed in claim 1, wherein the motor vehicle advances with respect to the road by means of drive wheels and a variable, representing the coefficient of friction ($\Phi$) between the drive wheels and the road is determined and the clutch is closed by means of automation, when the variable falls below a threshold value and wherein the unpowered operating phases are eliminated as long as said variable remains short of the threshold.

10. The process for carrying out an automated clutch actuation, as claimed in claim 1, wherein the motor vehicle has a virtual road network, which describes the topographical variables of the road; and the operating position of the clutch depends on said variables.

11. The process for carrying out an automated clutch actuation, as claimed in claim 1, wherein the motor vehicle has a virtual road network, which describes the traffic-regulating variables of the road; and the operating position of the clutch depends on said variables.

12. The process for carrying out an automated clutch actuation, as claimed in claim 1, wherein the motor vehicle has a virtual road network, which describes the variables relating to the dangerous spots on the road; and the operating position of the clutch (5) depends on these variables.

13. The process for carrying out an automated clutch actuation, as claimed in claim 1, wherein a variable representing the actuation of a brake is determined, and the clutch is closed by means of automation, when the variable is reduced below a threshold value, and the motor vehicle is in the unpowered operating phase.

14. The process for carrying out an automated clutch actuation, as claimed in claim 1, wherein a variable representing the actuation of a brake is determined, and that said variable is sensed over time; and the rate of change of said variable is sensed; and the operating position of the clutch depends on said rate of change.

15. The process for carrying out an automated clutch actuation, as claimed in claim 1, wherein driving speed is set by means of a gas pedal angle of a gas pedal having a deflection within a tolerance angle in the unpowered operating phase which does not result in the closing of the clutch but also in an interruption in the fuel feed of the drive engine whereby the tolerance angle exhibits a lower and an upper limiting value, and in which the lower limiting value is assigned to a driving engine speed reduction; and falling short of this lower limiting value results not only in an automated closing of the clutch but also in an interruption in the fuel feed of the drive engine.

16. The process for carrying out an automated clutch actuation, as claimed in claim 15, wherein the driver perceives the two limiting values as resistance (pressure points).

17. The process for carrying out an automated clutch actuation, as claimed in claim 6, wherein the clutch is opened by means of automation, when the rate of change of the gas pedal angle is negative and falls below a threshold value.

18. The process for carrying out an automated clutch actuation, as claimed in claim 6, wherein it is sensed whether the motor vehicle is on a downgrade and that the clutch is closed by means of automation, when, on the one hand, a downgrade is sensed and, on the other hand, the rate of change of the gas pedal angle is negative and falls below a threshold value.

19. The process for carrying out an automated clutch actuation, as claimed in claim 6, wherein the clutch is closed by means of automation, when the rate of change of the gas pedal angle is positive and exceeds a threshold value.

20. The process for carrying out an automated clutch actuation, as claimed in claim 7, wherein the clutch is closed by means of automation, when a threshold value of the transversal acceleration is exceeded.

21. The process for carrying out an automated clutch actuation, as claimed in claim 14, wherein the clutch is closed by means of automation, when the rate of change of the variable representing the actuation of a brake is negative and falls below a threshold value.

22. The process for carrying out an automated clutch actuation, as claimed in claim 14, wherein the clutch is opened by means of automation, when the rate of change of the variable representing the actuation of a brake is positive and exceeds a threshold value.

23. The process for carrying out an automated clutch actuation, as claimed in claim 3, wherein the threshold value depends on a speed of the motor vehicle.

24. The process for carrying out an automated clutch actuation, as claimed in claim 3, wherein the threshold value depends on the speed of the drive engine.

25. The process for carrying out an automated clutch actuation, as claimed in claim 3, wherein the threshold value depends on a transmission ratio, adjusted at a transmission.

26. The process for carrying out an automated clutch actuation as claimed in claim 3, wherein a variable representing the driving behavior of the motor vehicle driver exists in the motor vehicle; and the threshold value depends on this variable.

27. The process for carrying out an automated clutch actuation, as claimed in claim 10, wherein the motor vehicle includes a receiver, which records the variables from a transmitter.

28. The process for carrying out an automated clutch actuation, as claimed in claim 11, wherein the motor vehicle includes a receiver, which records the variables from a transmitter.

29. The process for carrying out an automated clutch actuation, as claimed in claim 12, wherein the motor vehicle includes a receiver, which records the variables from a transmitter.

30. The process for carrying out an automated clutch actuation, as claimed in claim 10, wherein the variables exist in the stored form on a data medium in the motor vehicle.

31. The process for carrying out an automated clutch actuation, as claimed in claim 11, wherein the variables exist in the stored form on a data medium in the motor vehicle.

32. The process for carrying out an automated clutch actuation, as claimed in claim 12, wherein the variables exit in the stored form on a data medium in the motor vehicle.

33. The process for carrying out an automated clutch actuation, as claimed in claim 8, wherein the visibility value, representing the visibility conditions, is a rain sensor.

34. The process for carrying out an automated clutch actuation, as claimed in claim 8, wherein the visibility value, representing the visibility conditions, depends on the operating state of a rear fog light or a front fog light of the motor vehicle.

35. The process for carrying out an automated clutch actuation, as claimed in claim 9, wherein the variable, representing the coefficient of friction ($\Phi$) between the drive wheels and the road, is a speed differential, which occurs between the drive wheels and the non-driven wheels.

36. The process for carrying out an automated clutch actuation, as claimed in claim 9, wherein the variable, representing the coefficient of friction ($\Phi$) between the drive wheels and the road, is determined by means of a sensor that measures the reflection of the light on the road.

* * * * *